Patented Oct. 31, 1933

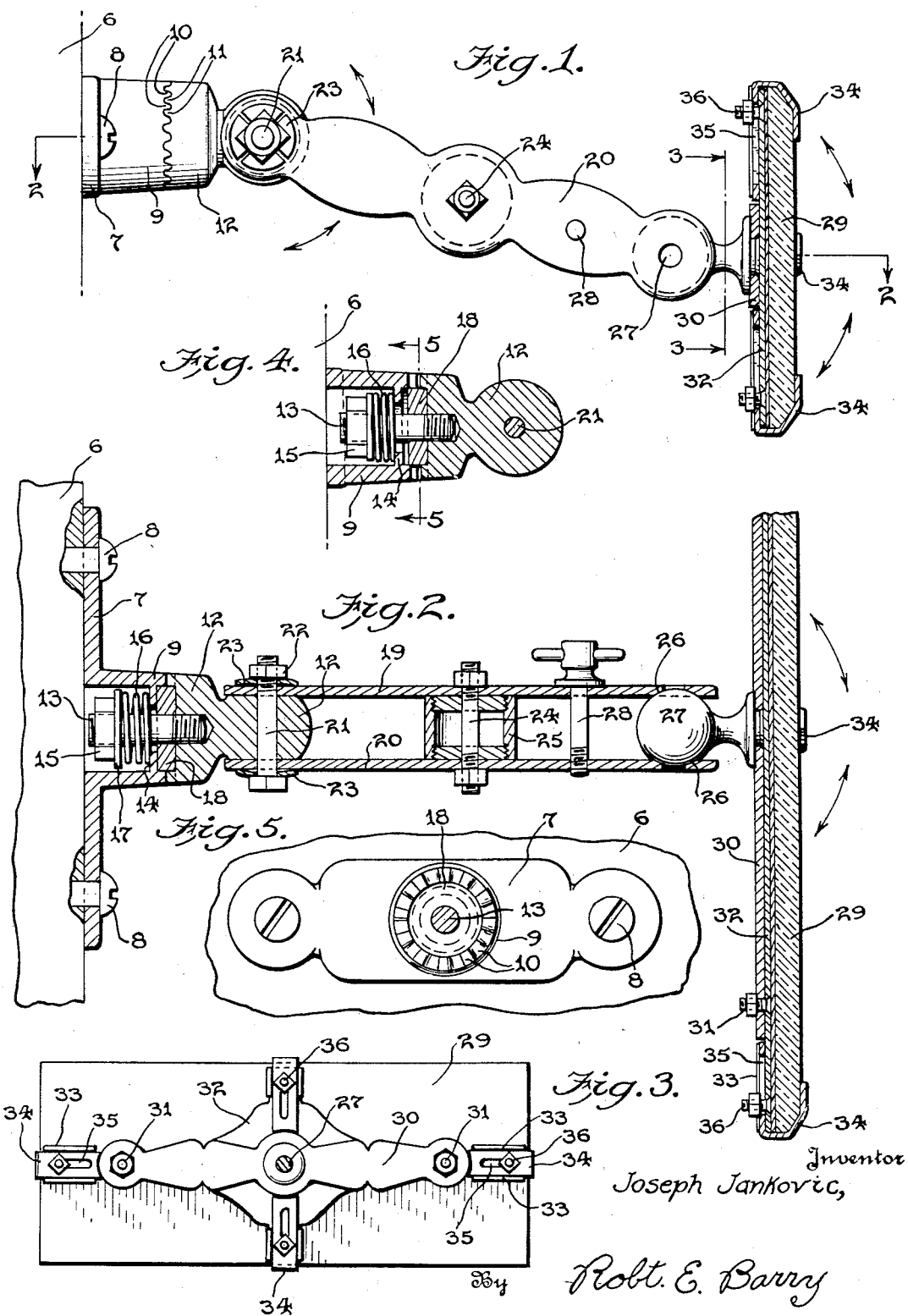

1,932,697

UNITED STATES PATENT OFFICE 1,932,697

MIRROR SUPPORTING DEVICE

Joseph Jankovic, Orangeburg, N. Y.; Caroline Jankovic, administratrix of said Joseph Jankovic, deceased Application January 27, 1931. Serial No. 511,607

2 Claims. (Cl. 248—20)

This invention relates to improvements in mirror supports, and more especially to a novel universally adjustable mirror support for use with the rear view mirrors of automobiles or the like.

The primary object of the invention is to provide a rear view mirror support of simple and inexpensive construction, and one so designed that the mirror may be readily placed in any desired position relatively to the supporting means, and be firmly held in its adjusted positions. Such a supporting device will accommodate the mirror for use by persons of various heights and by persons who desire the mirror at various angles for observing conditions at the rear of the automobile.

Another object is to furnish supporting means of this general character, including an adjustable skeleton frame or clamping device designed to accommodate mirrors of different lengths and heights.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation partly in vertical section of my improved device.

Fig. 2 is a transverse sectional view of the same, taken on line 3—3 of Fig. 1.

Fig. 3 is a sectional view on a reduced scale, taken on line 3—3 of Fig. 1

Fig 4 is a longitudinal sectional view of a detail, showing a spring forming part of the device, compressed to permit the dis-engagement of teeth forming part of one of the adjusting means.

Fig. 5 is a sectional view on the line 5—5 of Fig. 4.

Referring to the drawing, 6 designates a suitable support such as the frame bar above the windshield of an automobile. 7 designates a fixed bracket that is secured to the frame bar by any suitable means, such as screws 8. The bracket has an outwardly directed tubular part 9 which terminates in teeth 10 that normally mesh with similar teeth 11 at one end of a swivel member 12. This member is fixedly connected to a screw or bolt 13 which extends through the annular shoulder portion 14 of the socket 9 and is threaded to a nut 15. A coil spring 16 bears at one end against the shoulder, and at its opposite end against a washer 17 that is held in place by the nut, and this spring acts to yieldingly hold the teeth 10 and 11 in mesh. A guide washer 18 surrounds the bolt and acts to maintain the parts 9 and 12 in axial alignment when the member 12 is pulled away from the socket 9, as indicated in Fig. 4 to allow the swivel member to be turned about the axis of the bolt, so as to place the swivel member in any desired position.

A pair of arms 19 and 20 have certain of their ends pivotally connected by a bolt 21 to the swivel member, and a nut 22 on one end of the bolt is adapted to compress spring washers 23 for the purpose of frictionally holding the arms in any position to which they have been adjusted relatively to the swivel member 12.

Another bolt 24 connects the medial portions of the arms, and this bolt passes through a barrel or cylinder 25 which forms a spacer between the arms.

The ends of the arms opposite the bolt 21 are furnished with parti-spherical cavities 26 for the reception of the surface of a ball 27, and while this ball may be universally adjusted in these cavities, the friction contact between the parts is maintained by a hand screw 28 which acts to firmly secure the outer ends of the arms to the ball, so that the latter will remain in a desired position after it has once been adjusted. It is evident that the contacting surfaces of the ball and cavities allow the balls to also swing about an axis parallel to the bolt 21.

This type of adjustable support may be secured in any suitable way to the mirror 29, but I prefer to connect the ball to an adjustable frame which will accommodate mirrors of various sizes. For example, the ball is riveted to a cross bar 30 which in turn is connected by short bolts 31 to a cruci-form plate 32, the ends of the arm portions of which have their side edges bent to form parallel guide flanges 33. Each pair of the guide flanges cooperate with a hook 34 designed to engage an edge of the mirror, and each hook is slotted at 35 rearwardly of the mirror for the reception of a bolt 36 that is carried by the member 32 and functions to adjustably secure the hook in position.

As shown in Fig. 3, the adjustable clamping device accommodates a mirror of the smallest size, but obviously, if the hooks are drawn outwardly, the mirror may not only be removed, but a larger size mirror may be secured to the clamp.

From the foregoing it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. A universal support, comprising a fixed bracket, a swivel member connected to the bracket and having a swivel connection with the latter, meshing teeth on the bracket and swivel member, yielding means for normally holding said teeth in mesh, said bracket having an internal shoulder against which the yielding means bears, and a guide washer arranged between said shoulder and the swivel member.

2. A universal support, comprising a fixed bracket member, a swivel member connected to the bracket member and having a swivel connection with the latter, meshing teeth on the bracket member and swivel member, yielding means in one of said members for normally holding said teeth in mesh, one of said members having an internal shoulder against which the yielding means bears, and a guide washer arranged between said shoulder and the other one of said members.

JOSEPH JANKOVIC.